Feb. 23, 1926.  1,574,514
F. J. REICHMANN
LOUD SPEAKER
Filed May 22, 1924     3 Sheets-Sheet 1
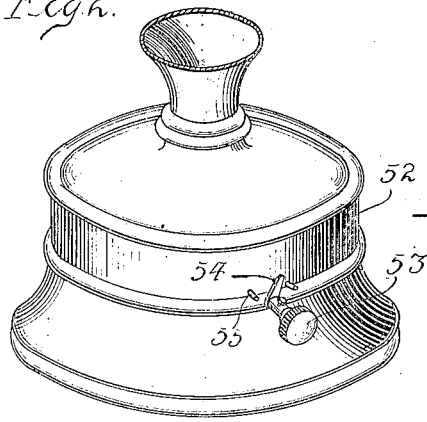
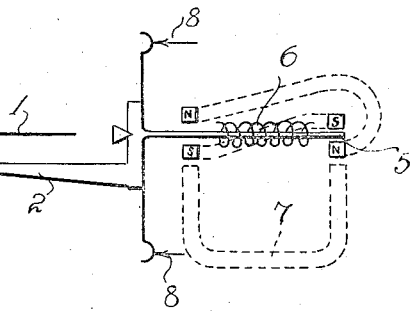
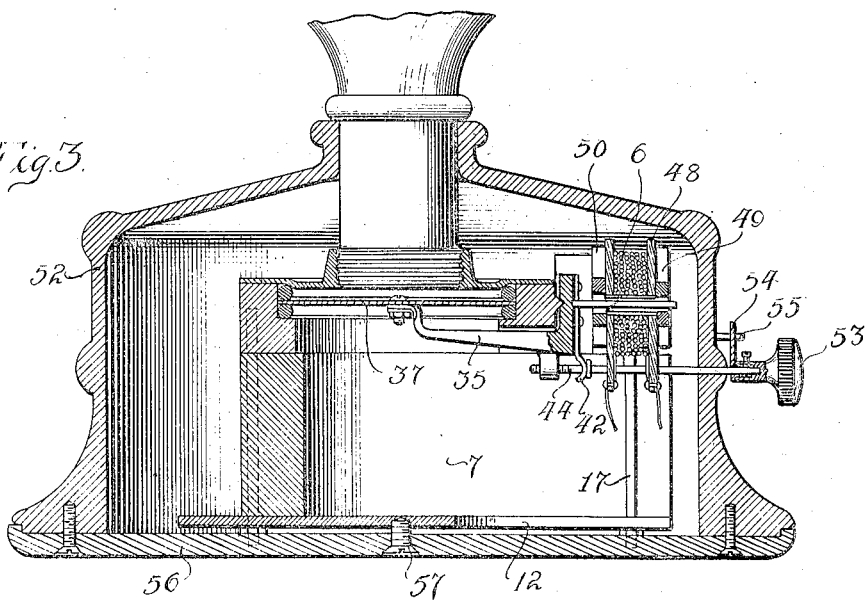
Inventor:
Frank J. Reichmann
by Albert Scheible
Attorney Feb. 23, 1926. 1,574,514
F. J. REICHMANN
LOUD SPEAKER
Filed May 22, 1924 3 Sheets-Sheet 2
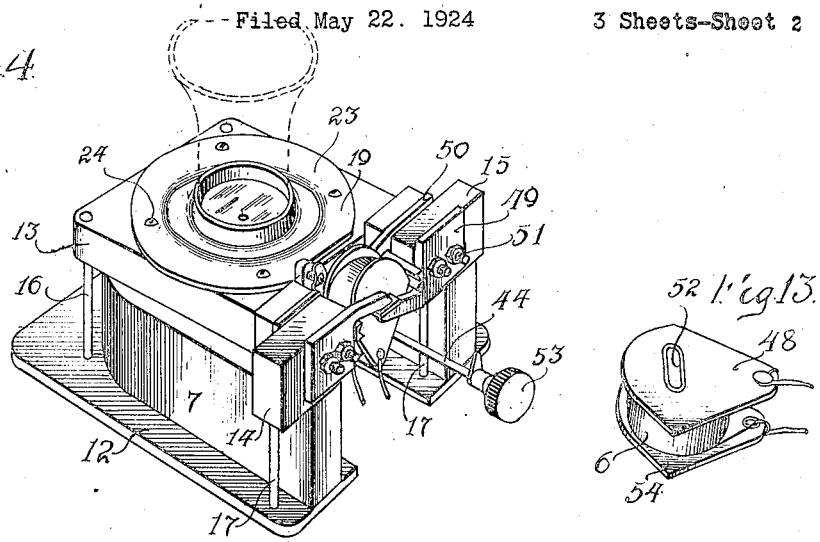
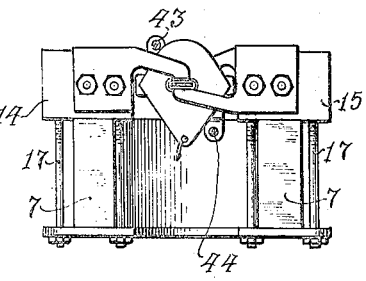
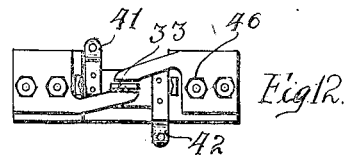
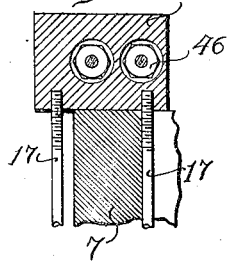
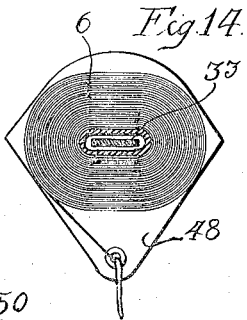
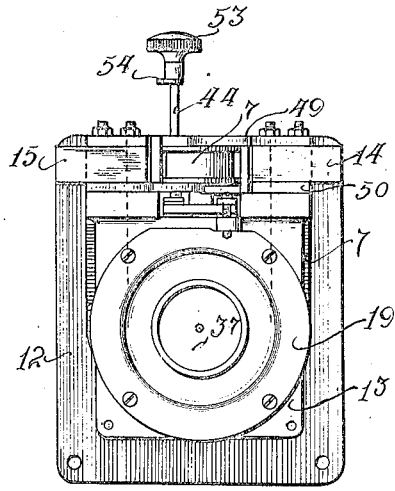
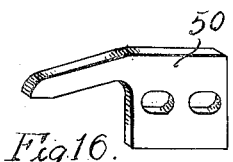
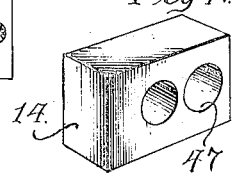
Inventor:
Frank J. Reichmann
by Albert Scheible
Attorney

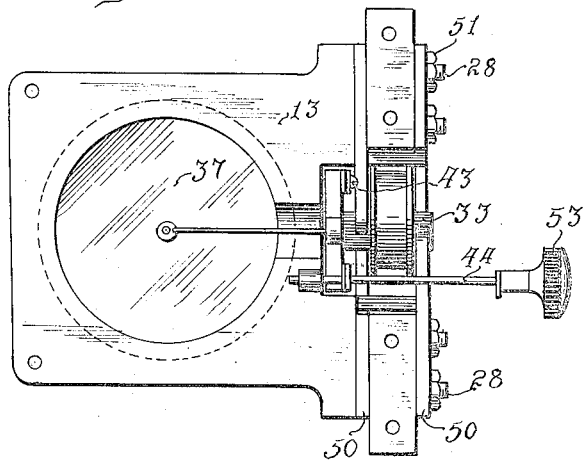
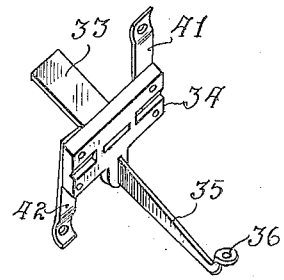
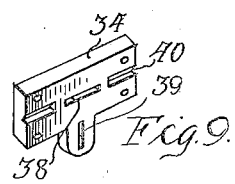
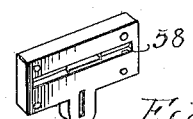
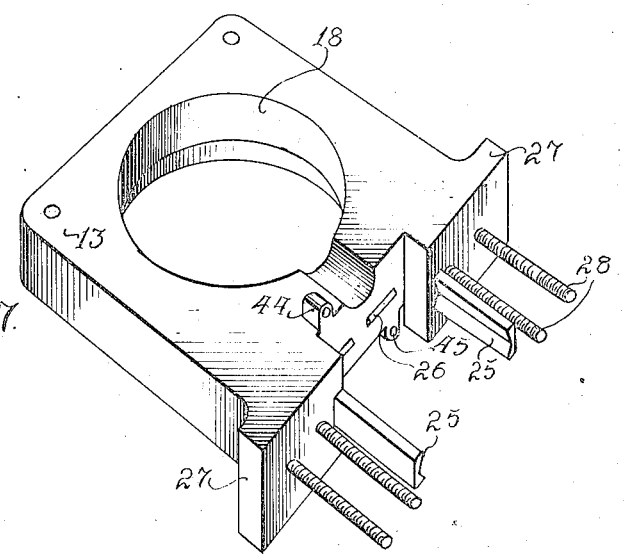

Patented Feb. 23, 1926.

1,574,514

UNITED STATES PATENT OFFICE.

FRANK J. REICHMANN, OF CHICAGO, ILLINOIS.

LOUD SPEAKER.

Application filed May 22, 1924. Serial No. 715,035.

*To all whom it may concern:*

Be it known that I, FRANK J. REICHMANN, a citizen of the United States, residing at Chicago, in the county of Cook and State of Illinois, have invented certain new and useful Improvements in a Loud Speaker; and I do hereby declare the following to be a full, clear, and exact description of the invention, such as will enable others skilled in the art to which it appertains to make and use the same.

My invention relates to telephonic receivers of the general class commonly employed as loud speakers in radio receiving apparatus and having an amplifying lever between the electro-magnetically vibrated armature and the sound-producing diaphragm. In some of its general aspects, it is the object of my invention to provide a telephonic receiver construction of this class arranged so that the parts can readily be assembled, so that the needed adjustments can readily be made with an unusual degree of accuracy, so that the diaphragm will be in a neutral or untensioned position when no translatable current is flowing, so that any later adjustments can be made without detaching any part of the receiver or of its casing, and so that an unusually effective amplification of sound can be obtained. In certain further aspects, my invention aims to provide a telephonic receiver employing two magnetic gaps spaced longitudinally of the permanent magnet associated therewith, aims to provide simple means for adjusting these gaps and so proportioning them as to afford an effective distribution of magnetic flux between them, and aims to provide a telephonic receiver construction in which the magnetic gaps can be adjusted with a high degree of accuracy before the permanent magnet is placed in effective position. Furthermore, my invention aims to accomplish all of these results in a simple, compact, easily manufactured, conveniently assembled and inexpensive construction.

Referring to some of the more particular aspects of my invention, it aims to provide a receiver construction which will require no drilling or tapping of the permanent magnet, which will slidably guide the energizing coil into a position in which this coil is properly disposed with respect to certain other parts, which will facilitate the assembly of the polepieces and which will employ the polepieces for holding the energizing coil firmly in its normal position. It also provides a construction in which the diaphragm is untensioned when the armature is in its neutral position and in which the diaphragm is not subjected to any strains exerted in other directions than axial of the diaphragm, thereby permitting the effective use of such a highly desirable material as mica for the diaphragm. It also provides a simple and easily adjusted pair of control means for adjusting the normal or inoperative position of the lever which carries the armature, provides simple means for locking one of these adjusting means, and provides means accessible from the exterior of the receiver for manipulating the other adjusting means, together with stop means for limiting the adjusting of the last named means.

Furthermore, my invention provides an unusually rigid armature, pivot bar and stylus assembly; provides an arrangement in which the armature has its medial plane in the plane of the pivoting knife edges and of the neutral position of the diaphragm, and provides a construction which will readily permit this alinement to be obtained. Moreover, my invention provides a receiver construction in which both the pivoting knife edges and the sockets for the adjusting screws can be formed integral with the supporting body, and provides simple means upon the pivot bar for preventing this from sliding longitudinally of the knife edges. It also provides an energizing coil construction which will reduce the average distance between the turns of the coil and an armature extending longitudinally through the coil, and in general provides a construction which will afford unusually high efficiency and sensitiveness and which will permit unusually small magnetic gaps to be employed without having the armature stick or "freeze". Still further and also more detailed objects will appear from the following specification and from the accompanying drawings, in which Fig. 1 is a diagram illustrating some of the features of the receiver of my invention.

Fig. 2 is a perspective view of a receiver embodying my invention, with the upper portion of the amplifying horn broken away.

Fig. 3 is a central and vertical section taken through the same embodiment along the axis of the adjusting screw which has the exposed knob.

Fig. 4 is a perspective view of the same embodiment with the casing removed.

Fig. 5 is a top view of the same.

Fig. 6 is a bottom view, taken before the assembled mechanism is attached to the permanent magnet and the bottom plate.

Fig. 7 is a perspective view of the main supporting member, showing the pivoting knife edges, the guides for the spool carrying the energizing coil, and the threaded stems for receiving the polepieces and the iron blocks interposed between certain polepieces.

Fig. 8 is a perspective view of the main movable member of my receiver.

Fig. 9 is a perspective view of the pivoting cross-bar of this member before the armature, springs and diaphragm arm are attached to the same.

Fig. 10 is a perspective view of an alternative form of pivoting cross-bar, namely one suitable for use with a single knife edge.

Fig. 11 is an end elevation of the telephonic receiver of Fig. 4, taken from the right hand end of that figure.

Fig. 12 is a similar end elevation taken before attaching either the coil which carries the energizing spool, the interposed pole extensions, or the outer pair of polepieces.

Fig. 13 is a perspective view of the spool carrying the energizing coil.

Fig. 14 is a transverse section taken through the spool alone centrally of its length.

Fig. 15 is a fragmentary transverse section through one of the iron blocks or pole extensions interposed between certain polepieces, taken along the correspondingly numbered line in Fig. 5.

Fig. 16 is a perspective view of one of the adjustable polepieces.

Fig. 17 is a perspective view of one of the pole extensions as interposed between the two polepieces adjacent to the same pole of the permanent horseshoe magnet.

In accomplishing the purposes of my invention after the manner of the accompanying drawings, I provide a receiver operating after the manner shown diagrammatically in Fig. 1, which figure shows a diaphragm 1 connected by a diaphragm arm 2 to a pivoting cross-bar 3 which is pivoted on a knife edge 4. The pivot bar 3 has rigidly connected to it an armature 5 extending in the opposite direction from the arm 2 through the bore of a coil 6 which receives the energizing telephonic current. This armature 5 extends between two pairs of polepieces disposed respectively at opposite ends of the coil 6 and having each pole piece connected to that one of the other pair of polepieces which is disposed at the opposite side of the armature, the said polepieces being made of soft iron and continuously polarized by means of a permanent magnet 7. The armature is normally held in a neutral position between the two pairs of polepieces by pressure applied through two screws 8 and 9 to a pair of oppositely directed springs 10 and 11 secured to the pivot bar and extending in opposite directions from the pivot which is here shown as a knife edge.

To secure both sensitiveness, clear articulation and high efficiency from a receiver constructed after the manner of this diagram, it is highly important that the friction at the pivot be as small as possible, that the strains upon the diaphragm should be only along the direction of its axis, that this diaphragm should be in a true neutral or untensioned position when no translatable energizing current is flowing through the coil, that the turns of the coil should be as close as practical to the armature, that the magnetization of every one of the polepieces should be intense, and that the airgaps between the armature and the polepieces should be as small as possible. Furthermore, it is important that simple means should be provided for overcoming the unbalancing effect due to any unidirectional flow of current through the energizing coil (such as that caused by the receiving tube of a radio apparatus), that the needed adjustment for this purpose should readily be made initially by the manufacturer without materially increasing the friction at the pivot, and that the user should be able to make a further adjustment of this kind according to the condition of the receiving tube and the battery employed by him. So also, it is important that the extent of the adjustments which can be made by a user for this purpose should be limited so as to prevent an inexperienced person from damaging the apparatus. Generally speaking, I obtain these highly important requirements in the following manner:—

To prevent side strains on the diaphragm, I place the pivoting axis of the main movable member (which axis is the edge of the knife edge 4 in Fig. 1) in the neutral plane of the diaphragm and shape the diaphragm arm 2 of the pivoted lever so that it presents an end abutting against the center of the diaphragm at right angles to the latter, thereby exerting a true axial pull or thrust on the diaphragm when fastened to the center of the latter and permitting the use of mica which it not feasible where strains are partly in other directions than axially of the diaphragm.

To insure the maximum sensitiveness of the diaphragm, I adjust the parts so that this diaphragm is in an untensioned or neutral position when the armature is in its neutral position. For this purpose, I initially adjust the pressure screws 8 and 9 so that they will hold the pivoting bar 3 against the knife edge with a quite light pressure, and so that the oppositely directed effect of the two springs will have a balancing action tending to hold the armature in a properly centered position between both pairs of polepieces. Then I apply further pressure through one of these screws to counteract the unbalancing effect of the direct current from the receiving tube, and for this purpose extend one of these screws beyond the casing so that this tube-flow-adjustment can be made from the exterior of the casing within limitations afforded by certain stops such as those hereafter described.

To secure an intense magnetic flux between each pair of polepieces, I connect these polepieces to the poles of a permanent magnet of much larger cross-section and provide a mounting which will enable each polepiece to be adjusted in position independently of the others, thereby permitting adjustments which will secure the minimum permissible airgaps between the armature and the four polepieces. To permit the two magnetic gaps to be spaced longitudinally of the permanent magnet, in which case one gap would afford a shorter magnetic circuit, I correspondingly increase the size of this gap so that it will not rob the other gap of a proper share of the magnetic flux, thereby affording a strong magnetic action at both gaps while having one of these quite small.

To secure the maximum magnetizing effect from the energizing coil on the armature, while employing an armature flattened for reducing the airgaps between it and the polepieces, I wind the energizing coil on a spool having a correspondingly flattened tubular stem, thereby decreasing the average distance between the armature and each turn of the coil, and correspondingly increasing the magnetization of the armature by a given flow of energizing current. I also provide simple means for holding the coil in proper axial and rotational alinement with the neutral position of the armature, so as to permit the employment of a coil having such a decidedly flattened bore.

Furthermore, to expedite and simplify the manufacture, assembly and adjustment, I provide a construction in which substantially all of the receiver parts excepting the permanent magnet can be assembled and adjusted before attaching the permanent magnet to the same, and in which no work whatever will be required upon the magnet.

Illustrative of such a construction, Fig. 4 shows a receiver embodying my invention and having a permanent magnet 7 of a horseshoe type clamped between a bottom plate 12 (desirably of brass) and an upper assembly which includes a supporting block 13 and a pair of magnet pole extensions 14 and 15, the clamping being effected by screws 16 threaded into the supporting block 13 and the other screws 17 threaded into the pole extensions 14 and 15. These latter screws 17 are here shown as four in number, namely two pairs each disposed at opposite sides of one of the poles of the permanent magnet to adopt them for clamping the pole extensions into firm contacting relation to the magnet poles although the screws (which desirably are of brass) may be out of contact with the magnet poles as shown in Fig. 7.

The supporting block 13 may be of any non-magnetic material and is here shown as having a bore 18 extending downwardly into it and contracted at a distance from its lower end so as to afford an annular shoulder 19 for supporting the lower one of the two cushioning rings 21 and 22 between which the diaphragm is clamped by the attaching of a cover plate 23 which is fastened to the supporting block 13 by screws 24 as shown in Figs. 3 and 4. This supporting block is shown also as having integral with it a pair of guideways 25 presenting opposed V-formations which extend parallel to each other and which have the apices of the V-sectioned grooves in the same plane with a pair of knife edges 26 also milled from this block, these knife edges in the illustrated embodiment being also substantially in the neutral plane of the diaphragm. The supporting block 13 may be widened at the end which has these guide formations and knife edges, so as to provide ears 27 which afford relatively wide bearings for engagement with the adjustable polepieces. Projecting from these ears 27 parallel to the guideways 25 are threaded stems 28 for supporting the polepieces and the pole extensions. Each of the polepieces is here shown as comprising a soft iron punching formed after the manner of Fig. 16 and comprising a main portion provided with a pair of perforations 30 of considerably larger diameter than the screws 28, together with an arm 31 having near its tip a straight-edged face spaced from the middle of the height of the block by a distance approximating one-half of the proposed average airgap between the two opposed polepieces. In assembling the polepieces, these are alternately inverted as shown in Figs. 11 and 12, so that the said straight-edged faces can extend close to the opposed flat faces of the interposed armature 33.

Each of the polepieces has a pair of transverse perforations arranged for guiding the polepieces approximately into its normal position, but these perforations are considerably larger in diameter than the threaded stem 28, so as to permit each polepiece to be shifted in position for adjusting airgap between it and the armature.

In assembling my receiver, the movable member which includes the armature and its connection to the diaphragm is first attached to the supporting block 13. This movable member desirably includes a pivoting cross bar 34 rigidly attached to the inner end of the armature and extending transversely of the latter, and a diaphragm arm 35 also rigidly attached to the pivoting cross bar 34 and terminating in a perforated bearing portion 36 which is riveted to the center of the diaphragm 37. To provide for a rigid and suitably alined assembly of these three parts and the moving member, I desirably provide the pivoting cross bar with a horizontal perforation 38 by which the inner end of the armature 33 is slidably received, and also provided with a vertical perforation 39 for similarly receiving one end of the diaphragm arm 35, and I preferably solder the inserted portions of the armature and the diaphragm to the pivoting bar when thus inserted.

To afford the pivoting, this cross bar is provided with one or more V-shaped grooves 40 according to the number of knife edges on the stationary supporting part which is here shown as the supporting block 13. Then I secure a pair of springs 41 and 42 to the opposite ends of the pivoting bar, which springs extend in opposite direction, and desirably have end portions concaved towards the diaphragm. These end portions are perforated for receiving the shanks of adjusting screws 43 which are respectively threaded into lugs 45 on the supporting block 13. By slightly tightening both of these screws, I can readily hold the pivoting bar against the two knife edges on the supporting block with a relatively light pressure, and by adjusting these screws, I can dispose the armature so that its axis is in the same plane with groove bottoms of the guides 25, this being the determining central plane of my energizing coil and polepiece desirably. When the said screws are adjusted so as to dispose the armature in this position, the diaphragm arm 35 (which for this purpose is made of a bendable material) be bent so that its tip 36 just touches the untensioned diaphragm and is then riveted to the center of the diaphragm, thereby disposing its armature in its proposed neutral position when the diaphragm is also neutral or untensioned.

After the armature is thus initially positioned, I slide the two inner polepieces upon the threaded stems and fasten each thereon by means of nuts 46 as shown in Fig. 12 after adjusting the polepieces to provide the desired airgap between them and the armature 33, this gap being sufficiently greater than the desired minute airgap between the outer polepieces so as to cause the proper proportion of the flux of the magnet to flow through the outer pair of polepieces. I then slide the two pole extensions 14 and 15 upon the threaded stems into flatwise engagement with the two inner polepieces as thus affixed, each of these pole extensions having a pair of perforations 47 of such size as to freely house the nuts 46 after the manner shown in Fig. 15. I also slide the assembled coiled spool 48 inwardly along the guides into flatwise engagement with the inner pair of polepieces, then slide the outer pair of polepieces 49 on the threaded stems, adjust these as to their position with respect to the armature and secure them rigidly by means of outer nuts 51 which also fit the threaded stems. These outer nuts cooperate with the threaded stems in serving the triple purpose of clamping the pole extensions 14 and 15 against the inner polepieces 50, clamping the outer polepieces 49 against these pole extensions, and clamping the adjacent end portions of the outer polepieces against the outer face of the coil spool 48, the latter having a length corresponding to the distance between the two pairs of polepieces.

To reduce the airgap between the windings on the energizing coil and the armature, I preferably provide the spool with a horizontally flattened tubular core 52 of only slightly larger height than the armature, thereby reducing the average distance between the turns of the coil and the armature as shown in Fig. 14 and hence increasing the energy transforming efficiency of the coil. I also provide the two heads of the spool with oppositely directed V-shaped extensions 54 having a spread corresponding to the distance between the bottoms of the grooves in the guides 25, thereby causing the spool to be guided horizontally into position when slid between these guides and preventing movement of the spool and its coil in any direction other than axially of the coil, the movement in the axial direction being prevented by the clamping action of the two pair of polepieces between which the spool is gripped.

After the operating mechanism has thus been assembled in its adjusted and alined relation, the assembly is placed upon the permanent magnet 7 as shown in Fig. 4 and attached to the latter by clamping screws 16 and 17 which extend upwardly from the bottom plate 12, thereby facing the pole extensions 14 and 15 firmly against the two poles of the permanent magnet. Since these clamping screws extend alongside the shanks of the magnet, no drilling or machining is required on the latter and the initial adjustments are made while the polepieces are not even under any magnetizing influence, thereby permitting an accurate and quite delicate adjustment with a quite light tensioning of the two springs 41 and 42. However, when such a receiver is used in a radio apparatus in connection with a vacuum receiving tube, the constant current flowing through this tube will produce a corresponding unidirectional flow through the energizing coil 6, thereby tending to produce north and south poles respectively opposite the two pairs of polepieces and hence disturbing the magnetic balance of the original adjustment. This can be compensated by a further regulation of one of the adjusting screws, but cannot be made permanently at the factory, as the volume of this unidirectional current will vary with the condition of the battery and of the tube. To allow for this, I extend one of the adjusting screws so that it can be manipulated from outside the casing 52 in which my receiver is mounted, as by elongating the screw 44 and providing this with a knob 53. Then I also desirably attach a stop arm 54 to the extended screw 44 and provide the casing with a pair of stop pins 55 for limiting the adjustment which can be made by the user, thereby preventing such an excessive movement of the screw as might interfere with the proper operation of my receiver.

By employing a larger airgap between the inner polepieces than I do between the outer ones, I prevent the magnetic flux through the inner polepieces from robbing the outer ones of their proper share of the flux, of the permanent magnet, which robbing would result with a uniform spacing between the polepieces of both pairs since one pair is closer to the pole ends of the magnet and hence would afford a longer circuit for the magnetic flux. Hence I am able to employ an arrangement in which the pairs of polepieces are spaced longitudinally of the magnet, thus utilizing a relatively larger and inexpensive permanent magnet. Furthermore, since no screws enter this magnet, it requires no machining such as would either reduce its permanent magnetization or would require repeated heat treatments and remagnetizing.

By providing an externally actuated adjustment, I adapt my receiver to effective use as part of a radio receiving set; and by limiting the extent of such adjustment, I avoid injury to the receiver by the recklessness of some amateur. However, I desirably arrange fastening for the adjusting knob so that this can be detached from the threaded stem carrying the same and partially rotated before again attaching the knob, thereby permitting any properly instructed person to increase the range of adjustment over that ordinarily permitted by the limiting stops. For this purpose, I desirably provide the knob with a square-sectioned bore fitting a correspondingly sectioned end portion of the threaded stem.

In practice, the bottom plate 12 is desirably provided with an opening between the two shanks of the magnet so as to afford ready access to the mechanism and inspection of the same, and this bottom plate is here shown as secured to the base 56 of the casing by screws 57.

However, I do not wish to be limited to the various details of construction and arrangement as here disclosed, it being obvious that many changes might be made without departing either from the spirit of my invention or from the appended claims. For example, Fig. 10 shows a pivoting bar differing from that of Fig. 9 in that it is provided with a single V-sectioned groove 58 for receiving a single knife edge, which knife edge desirably would correspond closely in length to the groove so as to have its walls engaged by the latter to prevent a shifting of the pivot bar along the knife edge. A similar shifting would be prevented in the case of the pivot bar of Figs. 8 and 9 by the engagement of the adjacent ends of the two knife edges with the inner ends of the two pivot grooves 40. Nor do I wish to be limited to the employment of all of the novel features of my invention in connection with one another, or to their use in an embodiment particularly adapted to form a part of a radio receiving outfit.

I claim as my invention:—

1. In a telephone receiver, a magnet coil, an armature extending substantially axially through the coil, two magnetic gaps respectively at opposite ends of the coil and through which gaps the armature extends, a diaphragm, a rigid lever connecting the diaphragm with the armature and having its pivoting axis outside the coil and between the diaphragm and one of the magnetic gaps, and a permanent magnet producing magnetic fluxes across both gaps in respectively opposite directions.

2. A telephone receiver construction as per claim 1, in which the magnetic gap nearest to the pivot is greater than the one at the opposite end of the said coil.

3. A telephone receiver construction as per claim 1, in which each magnetic gap is produced between a pair of polepieces, each of the polepieces being independently adjustable.

4. In a telephonic receiver, an assembly comprising an armature movable between two pairs of polepieces and connected to a diaphragm, a diaphragm casing, two magnet pole extensions secured to the said casing and each carrying one polepiece of each pair, and a permanent magnet clamped against this unit with its poles respectively bearing against the two magnet pole extensions.

5. In a telephone receiver, a diaphragm, an energizing coil, an armature extending through the bore of the coil, a lever connecting the armature with the diaphragm and having its pivoting axis transverse of the axis of the coil and between the coil and the diaphragm, and means independent of the coil for producing two oppositely directed magnetic fluxes transversely through the armature respectively between the coil and the said pivoting axis and at the other end of the coil.

6. A telephone receiver as per claim 5, in combination with separate means for adjusting the two magnetic fluxes into symmetry with respect to the axis of the coil.

7. In a telephonic receiver, a permanent horseshoe magnet, a pair of pole extensions respectively engaging the two poles of the maget on the same face of the magnet, two pairs of polepieces respectively secured to the pole extensions and cooperating to afford two magnetic gaps spaced by different distances from the pole tips of the maget, and a pivoted armature extending through both magnetic gaps, the magnetic gap which is nearest to the pole tips being smaller than the other gap so as to reduce the shunting effect of the said other gap on the magnetic circuit.

8. In a telephonic receiver, a permanent horseshoe magnet, a pair of pole extensions respectively engaging the two poles of the magnet on the same face of the magnet, two pairs of polepieces respectively secured to the pole extensions and cooperating to afford two magnetic gaps spaced by different distances from the pole tips of the magnet, and a pivoted armature extending through both magnetic gaps, the magnetic gap which is nearest to the pole tips being sufficiently smaller than the other gap to reduce the shunting effect of the latter on the magnetic circuit so as to substantially equalize the magnetic flux across the two gaps.

9. In a telephone receiver of the type having a diaphragm connected to a pivoted armature, an energizing coil normally housing a part of the armature spaced from the pivot axis of the armature, and a permanent magnet having two pairs of polepieces adjacent to the armature and respectively at opposite ends of the spool, the airgap between the armature and the polepieces being larger for the pair nearest the pivot of the armature than for the other pair.

10. In a telephonic receiver of the type having a pivoted armature extending through two magnetic gaps spaced by an energizing coil through which the armature also extends, a diaphragm, a rigid connection between the diaphragm and the armature, and spring means for holding the armature yieldingly in balanced relation to the two magnetic gaps when no current is flowing through the coil, a casing housing the aforesaid elements, and means extending through the casing and operable from outside the latter for adjusting the spring means to compensate for the effect on the armature of unidirectional current flow through the coil.

11. A telephonic receiver as per claim 10, in combination with stop means for normally limiting the extent of the said adjustment.

12. A telephonic receiver comprising as a rigid unit a diaphragm casing, two pairs of polepieces, two pole extensions disposed between the said pairs, an energizing coil disposed between the pole extensions; a pivoted member including an armature extending through the coil and between the polepieces of both pairs and a connection between the armature and the diaphragm; and yielding means for normally holding the pivoted member in predetermined position; a permanent magnet supporting the above recited assembly of the rigid unit, the pivoted member and the spring means with the pole extensions respectively engaging the poles of the magnet; a clamping plate supporting the magnet, and clamping members connecting the said unit with the clamping plate to clamp the magnet therebetween.

13. A telephonic receiver as per claim 12, in combination with means supported by the said rigid unit for adjusting the said yielding means.

14. A telephonic receiver as per claim 12, in combination with a casing housing all of the aforesaid and having a perforation, and means extending through the casing and operable from outside the latter for adjusting the spring means.

15. In a telephonic receiver, the combination with a diaphragm and a magnet spool, of a pivoted member; the said member comprising a pivoting bar having a socket formation, a diaphragm arm fast upon the pivoting bar and extending transversely of the said bar, and connected to the diaphragm, and an armature extending through the bore of the magnet coil transversely of the said bar in the opposite direction from the diaphragm arm, the armature having one end socketed in the said socket formation.

16. In a telephonic receiver, the combination with a diaphragm of a pivoted member comprising a diaphragm arm and an armature extending transversely of and in opposite directions from a pivoting bar, the armature and the diaphragm arm each having one end socketed in the pivoting bar.

17. In a telephone receiver, an energizing coil, two pairs of polepieces respectively disposed at opposite ends of the spool for affording two magnetic gaps in substantial alinement with the bore of the spool, a permanent magnet for polarizing all four polepieces, and a pivoted armature extending through the bore of the coil and having its pivoting axis outside the coil and in a plane axial of the coil, both the armature and the bore of the coil being flattened parallel to the said plane.

18. In a telephone receiver, an energizing coil having a flattened bore, a correspondingly flattened armature extending through the bore of the coil, two pairs of polepieces respectively disposed at opposite ends of the coil with the armature extending between the polepieces of each pair, a diaphragm, and a lever connecting the armature with the diaphragm and having its pivoting axis disposed in a plane parallel to the flattened bore walls.

19. In a telephone receiver, a diaphragm, an armature connected thereto, two pairs of polepieces spaced longitudinally of the armature and having the armature extending between the polepieces of each pair, two soft iron blocks respectively clamped between the polepieces at each side of the armature, a mounting permitting separate adjustment of the positions of the polepieces, a permanent magnet having its poles normally respectively in engagement with the said blocks, and means external of the magnet for clamping the magnet in its said disposition.

20. A telephone receiver as per claim 19, in which the clamping means include bolts threaded into the said blocks and extending alongside the poles of the permanent magnet.

21. In a telephone receiver of the type in which an armature extends through a coil between magnetic gaps and is connected by a lever to a diaphragm, a single-piece diaphragm casing and coil guide.

22. In a telephone receiver of the type in which an armature extends through a coil and between magnetic gaps disposed at opposite ends of the coil and is connected by a lever to a diaphragm, a single-piece diaphragm casing and coil guide having lever-pivoting formations integral therewith.

23. In a telephone receiver, an armature, a lever connecting the center of the diaphragm with the armature, a pair of guide ways extending at opposite sides of the armature and longitudinally of the armature, and an energizing coil member having guides at diametrically opposite sides thereof fitting the guideways to guide the coil into axial alinement with the armature.

24. A telephone receiver as per claim 23, in which the energizing coil member includes a spool having heads fitting the guideways.

25. In a telephone receiver, a magnet spool, pole pieces respectively engaging opposite ends of the spool to prevent longitudinal movement thereof, and spool supporting means in which the spool is longitudinally insertable and which prevent lateral or rotational movement of the spool.

26. A receiver construction as per claim 25, in which the spool supporting means comprise plural guides extending longitudinally of the spool and in which the spool has formations at each end slidably engaging the said guides.

27. In a telephone receiver of the type having a diaphragm connected to a pivoted armature, an energizing spool normally housing part of the armature, a permanent magnet, and movable polepieces associated respectively with the poles of the magnet and respectively disposed at opposite ends of the spool and clamping the said spool endwise between them.

28. In a telephone receiver of the type having a diaphragm connected to a pivoted armature, an energizing spool normally housing part of the armature, a support slidably receiving the spool in a disposition in which the spool is coaxial with the neutral position of the armature, and polepieces clamping the spool between them.

29. In a telephone receiver, an energizing coil, a pivoted armature extending through the coil, and a mounting for the coil including a guide in which the coil is slidable longitudinally of the armature, and means independent of the guide for clamping the coil in a predetermined position.

30. In a telephone receiver, an energizing coil, two pairs of polepieces respectively at opposite ends of the coil, a pivoted armature extending through the coil and between the polepieces of each pair, and unitary supporting means for the said coil, polepieces and armature, the said supporting means being arranged to permit the attaching and adjusting of the armature before the polepieces and coil are placed in position.

31. In a telephone receiver, an energizing coil, two pairs of polepieces respectively at opposite ends of the coil, a pivoted armature extending through the coil and between the polepieces of each pair, and unitary supporting means for the said coil, polepieces and armature, the said supporting means being arranged to permit the attaching and adjusting of the armature and one pair of polepieces before the coil and the other pair of polepieces are placed in position.

32. In a telephone receiver, a lever comprising a medial pivot bar, and a diaphragm arm and an armature extending respectively in opposite directions from the pivot bar, the pivot bar extending transverse of the said arm and armature and having a groove extending longitudinally thereof, and a stationary knife edge entering the said groove, the groove having an end wall adapted to engage the ends of the knife edge to limit the movement of the pivot bar longitudinally of the knife edge in one direction.

33. In a telephone receiver, a lever comprising a medial pivot bar, and a diaphragm arm and an armature extending respectively in opposite directions from the pivot bar, the pivot bar extending transverse of the said arm and armature and having a pair of alined grooves extending longitudinally thereof, and a pair of stationary and alined knife edges respectively entering the said grooves, the two grooves having relatively opposite end walls each adapted to engage one end of the adjacent knife edges for preventing movement of the pivot bar longitudinally of the knife edges in respectively opposite directions.

34. In a telephonic receiver of the type having a pivoted armature extending through two magnetic gaps spaced by an energizing coil through which the armature also extends, a diaphragm, a rigid connection between the diaphragm and the armature, spring means for holding the armature yieldingly in balanced relation to the two magnetic gaps when no current is flowing through the coil; a casing housing the aforesaid elements, and means extending through the casing and operable from outside the latter for adjusting the spring means to compensate for the effect on the armature of unidirectional current flow through the coil.

35. A telephonic receiver as per claim 34, in combination with stop means for normally limiting the extent of the said adjustment, and means operable from outside the casing for adjusting the stop means to increase the said adjustment.

36. In a telephone receiver, an energizing coil, two pairs of pole pieces respectively disposed at opposite ends of the spool for affording two magnetic gaps in substantial alinement with the bore of the spool, a permanent magnet for polarizing all four pole pieces, and a pivoted armature extending through the bore of the coil and having its pivoting axis outside the coil and in a plane axial of the coil.

37. In a telephone receiver, an energizing coil, a flat armature extending through the bore of the coil, two pairs of pole pieces respectively disposed at opposite ends of the coil with the armature extending flatwise between the pole pieces of each pair, a diaphragm, and a lever connecting the armature with the diaphragm and having its pivoting axis disposed in a plane parallel to the flat faces of the armature.

Signed at Chicago, Illinois, May 20th, 1924.

FRANK J. REICHMANN.